United States Patent
Kodaira

(10) Patent No.: US 9,245,575 B2
(45) Date of Patent: Jan. 26, 2016

(54) LIBRARY DEVICE

(75) Inventor: Minoru Kodaira, Tokyo (JP)

(73) Assignee: NEC PLATFORMS, LTD., Kanagawa (JP)

( * ) Notice: Subject to any disclaimer, the term of this patent is extended or adjusted under 35 U.S.C. 154(b) by 607 days.

(21) Appl. No.: 12/678,609

(22) PCT Filed: Sep. 12, 2008

(86) PCT No.: PCT/JP2008/066514
§ 371 (c)(1),
(2), (4) Date: Mar. 17, 2010

(87) PCT Pub. No.: WO2009/041291
PCT Pub. Date: Apr. 2, 2009

(65) Prior Publication Data
US 2010/0217748 A1    Aug. 26, 2010

(30) Foreign Application Priority Data
Sep. 28, 2007    (JP) .................................. 2007-254144

(51) Int. Cl.
G11B 17/22    (2006.01)
G11B 15/68    (2006.01)

(52) U.S. Cl.
CPC ............ G11B 17/228 (2013.01); G11B 15/689 (2013.01)

(58) Field of Classification Search
USPC .................................................. 707/600–704
See application file for complete search history.

(56) References Cited

U.S. PATENT DOCUMENTS

| | | |
|---|---|---|
| 6,005,734 A | 12/1999 | Shimada et al. |
| 2004/0133742 A1* | 7/2004 | Vasudevan et al. ............ 711/114 |
| 2006/0039248 A1* | 2/2006 | Sasaki ........................ 369/30.27 |
| 2006/0224881 A1 | 10/2006 | Pierce et al. |
| 2007/0220307 A1* | 9/2007 | Ishii et al. ......................... 714/5 |

FOREIGN PATENT DOCUMENTS

| | | |
|---|---|---|
| JP | 06-168076 | 6/1994 |
| JP | 06-176035 | 6/1994 |
| JP | 09-198755 | 7/1997 |
| JP | 11-039755 | 2/1999 |
| JP | 2002-133751 | 5/2002 |
| JP | 2003-016715 | 1/2003 |
| JP | 2006-059449 | 3/2006 |

OTHER PUBLICATIONS

International Search Report, PCT/JP2008/066514, Oct. 14, 2008.
Extended European Search Report—EP 08 83 4201—Aug. 31, 2012.

* cited by examiner

*Primary Examiner* — Hosain Alam
*Assistant Examiner* — Tuan-Khanh Phan
(74) *Attorney, Agent, or Firm* — Young & Thompson

(57) ABSTRACT

It is required that setting information and mechanical correction information of a preceding device can be automatically carried over only by replacing a unit, to implement reduction in the maintenance cost and prevention of human operational mistakes. Library device control firmware 11 updates, if drive identification information kept in a library control unit 10 differs from drive identification information kept in two other units on the basis of logic of decision by majority, a drive serial number 4A and device setting information 2A kept in the library control unit 10 based on a drive serial number 4B and device setting information 2B kept in an accessor control unit 20.

8 Claims, 2 Drawing Sheets

F I G. 1
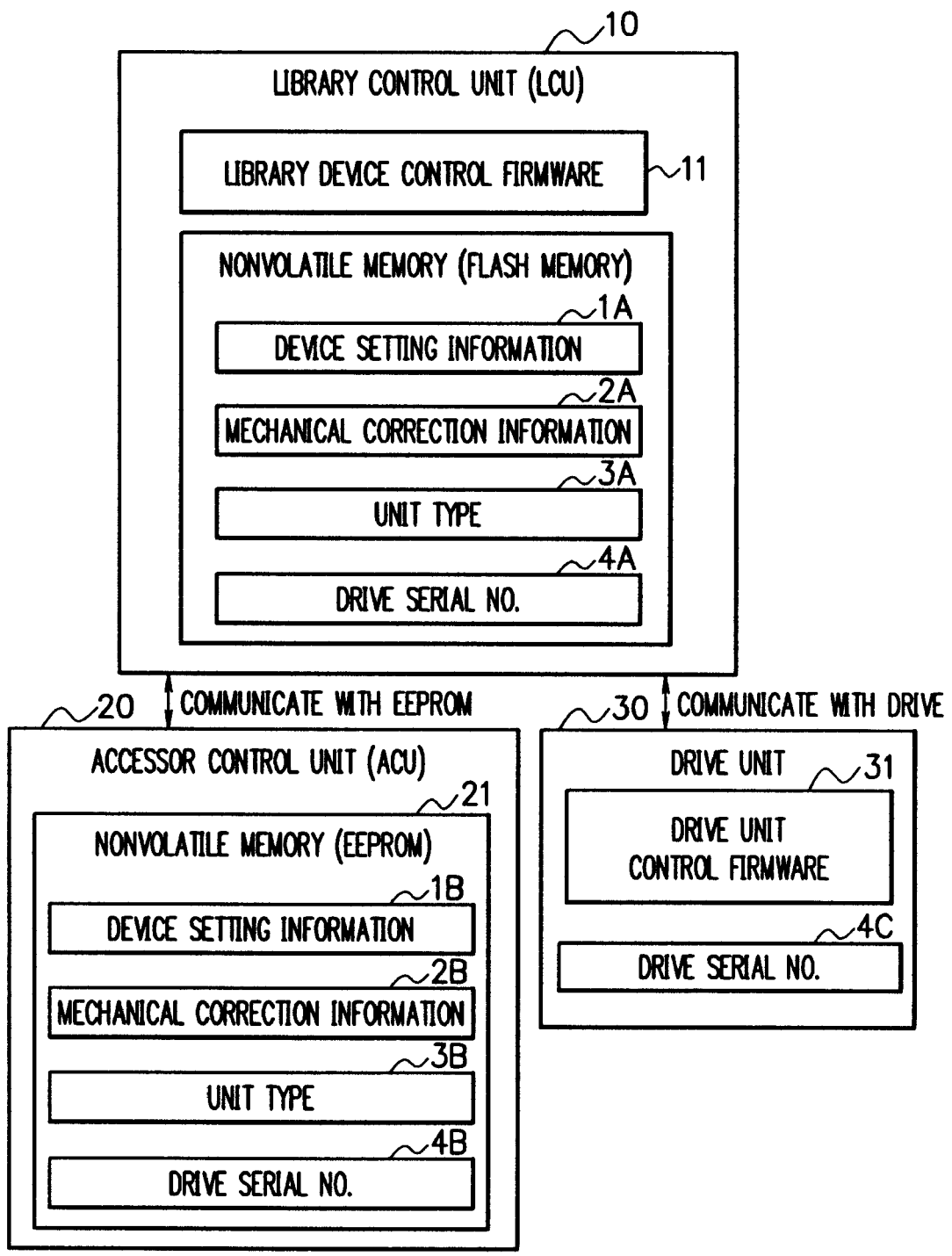

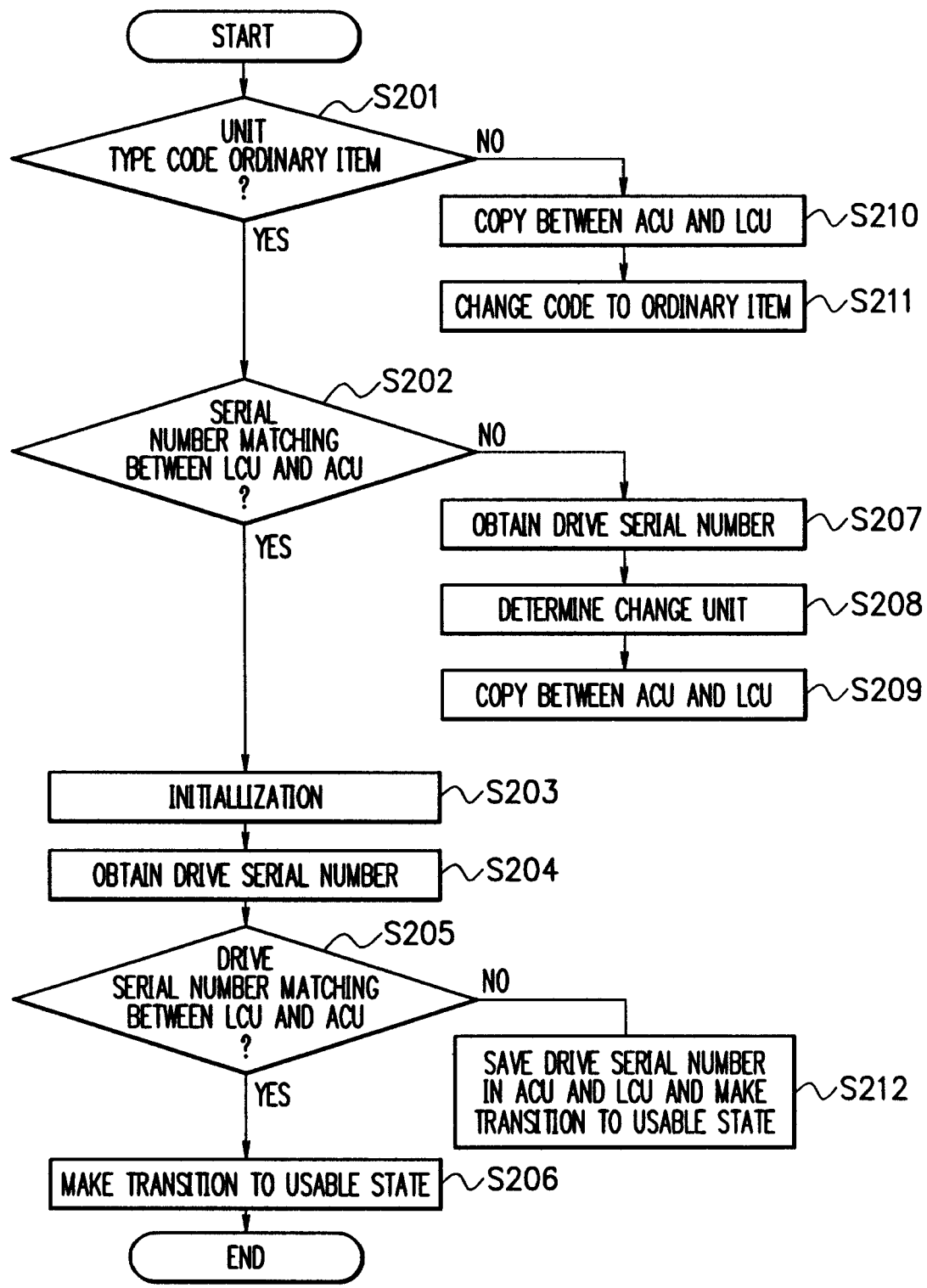

LIBRARY DEVICE

BACKGROUND OF THE INVENTION

1. Field of the Invention

The present invention relates to a technique to automatically carry over, in a library device, setting information and mechanical correction information of a preceding device.

2. Description of the Related Art

When replacing a unit in a library device, a maintenance operator manually collects device setting information and mechanical correction information from the device before replacement, and sets the collected information to the device after replacement of a maintenance unit.

In this regard, there has been proposed a technique wherein a package name, a production number, and a revision are beforehand written in a storage of a package such that when the package is installed in the device, a reader section reads data from the storage and sends the data to a data collecting section to thereby collect the data, and a control section compares by a comparator section the collected data with the data stored in the storage, and updates if the data differs therebetween, the data in the storage, to thereby save the managing operation and to thereby prevent operation errors when the maintenance operator replaces the package (reference is to be made to, for example, Patent Document 1).

Patent Document 1: Japanese Patent Laid-Open Publication Ser. No. Hei 6-176035

SUMMARY OF THE INVENTION

However, in the related art described above, the maintenance operator manually conducts operation; hence, the maintenance cost is to be taken into consideration and human operational mistakes possibly take place. In addition, in a case of failure in the maintenance unit, it is likely that the preceding information cannot be collected; in such situation, there exists a risk that the state of the device before the failure cannot be restored.

Also, the data is stored in the storage; hence, if the data in the storage is not correct, reliability is not secured.

It is therefore an object of the present invention, which has been devised to remove the problem above, to provide a library device wherein without storing data in a storage, when a user or a maintenance operator only replaces a unit, the setting information and the mechanical correction information of the preceding device are automatically carried over, to thereby implement reduction in the maintenance cost and prevention of human operational mistakes.

To achieve the object above, the present invention has the following aspects.

A first library device of the present invention is a library device comprising a library control unit, an accessor control unit, and a drive unit, characterized in that a control section of the library control unit obtains identification information items of drives kept in the library control unit, the accessor control unit, and the drive unit; compares the three information items with each other; and updates, if the drive identification information item kept in the library control unit differs from that kept in the accessor control unit and that kept in the drive unit, the drive identification information item and device setting information kept in the library control unit based on the drive identification information item and device setting information kept in the accessor control unit.

Furthermore, a second library device of the present invention is a library device comprising a library control unit, an accessor control unit, and a drive unit, characterized in that a control section of the library control unit obtains identification information items of drives kept in the library control unit, the accessor control unit, and the drive unit; compares the three information items with each other; and updates, if the drive identification information item kept in the accessor control unit differs from that kept in the library control unit and that kept in the drive unit, the drive identification information item and device setting information kept in the accessor control unit based on the drive identification information item and device setting information kept in the library control unit.

Also, a third library device of the present invention is a library device comprising a library control unit, an accessor control unit, and a drive unit, characterized in that a control section of the library control unit obtains unit type information to discriminate an ordinary item type or a maintenance item type of a unit kept in each of the library control unit and the accessor control unit, and updates, if the unit type information kept in the library control unit is the maintenance item type, the drive identification information item and device setting information kept in the library control unit based on the drive identification information item and device setting information kept in the accessor control unit.

Additionally, a fourth library device of the present invention is a library device comprising a library control unit, an accessor control unit, and a drive unit, characterized in that a control section of the library control unit obtains unit type information to discriminate an ordinary item type or a maintenance item type of a unit kept in each of the library control unit and the accessor control unit, and updates, if the unit type information kept in the accessor control unit is the maintenance item type, the drive identification information item and device setting information kept in the accessor control unit based on the drive identification information item and device setting information kept in the library control unit.

In accordance with the present invention, without storing data in a storage, when a user or a maintenance operator only replaces a unit, the setting information and the mechanical correction information of the preceding device are automatically carried over, to thereby implement reduction in the maintenance cost and prevention of human operational mistakes.

BRIEF DESCRIPTION OF THE DRAWING FIGURES

FIG. 1 is a diagram showing a system configuration according to an embodying mode of the present invention.

FIG. 2 is a flowchart of a processing operation according to an embodying mode of the present invention.

DETAILED DESCRIPTION OF THE INVENTION

Next, description will be given in detail of a mode of embodying the present invention by referring to drawings. A library device in the embodying mode shown in FIG. 1 includes a library control unit (to be referred to as "LCU" hereinbelow) 10, an accessor control unit (to be referred to as "ACU" hereinbelow) 20, and a drive unit 30.

The LCU 10 shown in FIG. 1 is a unit including a control board to control the library device and the ACU 20 is a unit including a robot section to transport a medium. Library device control firmware 11 to control the library device is stored in the control board in the LCU 10 and operates on the board.

The LCU 10 keeps device setting information 1A, mechanical correction information 2A, a unit type 3A, and a drive serial number 4A in a nonvolatile memory, e.g., a flash memory or the like. The ACU 20 keeps device setting information 1B, mechanical correction information 2B, a unit type 3B, and a drive serial number 4B in a nonvolatile memory, e.g., an EEPROM or the like. The drive unit 30 keeps a drive serial number 4C in a predetermined storage. Here, the device setting information includes various setting items and the mechanical correction information is, for example, a position correction value of the accessor or the like. The drive serial number is an example of information to uniquely identify a drive unit and may be a desired ID or the like. Incidentally, the information keeping sections above are not limited to nonvolatile memories and may be implemented using desired storage means.

In addition, the LCU 10 includes means to communicate with the EEPROM in the ACU 20 and means to communicate with the drive unit 30.

Next, referring to the drawings, description will be given in detail of the present embodying mode.

First, description will be given of an ordinary device activation flow. Referring to FIG. 2, the library device control firmware in the LCU is first executed by a device power off/on operation to confirm a unit type code to discriminate a normal item type or a maintenance item type for units stored in the LCU and the ACU (S201). This may be discriminated by a flag or the like. At delivery of the LCU and the ACU as maintenance parts, if a unit type code is designated, it is possible to realize a precise carry-over operation. And if the type is a normal item for both units (yes in S201), the drive serial numbers stored in both units are then confirmed (S202).

If the drive serial numbers stored in both units match each other (yes in S202), it is judged that no unit has been replaced, and then the device setting information and the mechanical correction information are determined to start the device initialization by use of the information stored in the LCU (S203).

Finally, communication is conducted with the drive to obtain a drive serial number (S204) to confirm the serial number (S205). If the serial number is equal to those of the LCU and the ACU (yes in S205), the device is directly set through a transition to a usable state (S206). At this point of time, the drive serial numbers of the ACU, the LCU, and the drive unit match each other. Also, the device setting information and the mechanical correction information match between the ACU and the LCU. Incidentally, thereafter, if a change takes place in the device setting information and/or the mechanical correction information, the same information thus changed is saved in the nonvolatile memories of the LCU and the ACU.

Next, description will be given of an operation flow in a situation wherein each maintenance unit is replaced.

Replacement to LCU of normal item type:

Since the drive serial numbers stored in both units do not match each other in the step S202 (no in S202), communication is conducted after waiting for drive activation to obtain a serial number of the mounted drive (S207).

After the serial number is obtained, the drive serial numbers respectively of the ACU, the LCU, and the drive unit are compared with each other to determine that a unit having a different drive serial number as a replaced unit (S208). Here, according to logic of decision by majority, 2 is the majority in 2 to 1 in the determination. In this case, since the LCU differs, information is copied onto the LCU from the ACU in which the device setting information, the mechanical correction information, and the drive serial number before the replacement of the drive serial number are kept remained (S209).

After the copy has been completely finished, processing of the step 204 and subsequent steps is executed.

Replacement to ACU of normal item type:

Since the drive serial numbers stored in both units do not match with each other in the step S202 (no in S202), communication is conducted after waiting for drive activation to obtain a serial number of the mounted drive (S207).

After the serial number is obtained, the drive serial numbers respectively of the ACU, the LCU, and the drive unit are compared with each other to determine that a unit having a different drive serial number as a replaced unit (S208). In this case, since the ACU differs, information is copied onto the ACU from the LCU in which the device setting information, the mechanical correction information, and the drive serial number before the replacement of the drive serial number are kept remained (S209).

After the copy has been completely finished, processing of the step 204 and subsequent steps is executed.

Replacement to LCU of maintenance item type:

Since the unit type code is the maintenance item type, it is explicitly known that the LCU has been changed in the step S201 (no in S201), the system copies, from the ACU in which the device setting information, the mechanical correction information, and the drive serial number before the replacement are kept remained, the device setting information, the mechanical correction information, and the drive serial number information onto the LCU (S210).

After the copy has been completely finished, the unit type code is changed to the normal item (S211), and then processing of the step 204 and subsequent steps is executed. Incidentally, when the maintenance item type is designated, the waiting for the drive activation as in the case of replacement by the LCU of the normal item type is not required; hence, the operation period of time can be reduced in the replacement.

Replacement to ACU of maintenance item type:

Since the unit type code is the maintenance item type, it is explicitly known that the ACU has been changed in the step S201 (no in S201), the system copies information onto the ACU from the LCU in which the device setting information, the mechanical correction information, and the drive serial number before the replacement are kept remained (S210).

After the copy has been completely finished, the unit type code is changed to the normal item (S211), and then processing of the step 204 and subsequent steps is executed. Incidentally, when the maintenance item type is designated, the waiting for the drive activation as in the case of replacement by the ACU of the normal item type is not required; hence, the operation period of time can be reduced in the replacement.

Replacement of drive unit:

In the step S204, if the serial number obtained from the drive does not match with those of the LCU and the ACU (no in S205), a serial number of the replaced drive is saved in the nonvolatile memories of the LCU and the ACU and the device is set through a transition to a usable state (S212). Thereafter, if a change takes place in the device setting information and/or the mechanical correction information, the same information thus changed is saved in the nonvolatile memories of the LCU and the ACU.

Incidentally, each embodying mode described above is a favorable embodying mode of the present invention and may be changed in various ways without departing from the scope of the gist of the present invention. For example, it is possible that the library device reads a program which implements the function of the library device to execute the program such that the processing to implement the function of the device is performed. Moreover, the program may be transmitted to another computer system via a computer-readable recording medium such as a CD-ROM or a magnetooptical disk or by use of transmission waves via a transmission medium such as the internet and/or a telephone communication line.

This application is based upon and claims the benefit of priority from Japanese patent application No. 2007-254144, filed on Sep. 28, 2007, the disclosure of which is incorporated herein its entirety by reference.

Industrial Applicability

The present invention is applicable to, for example, a library device which automatically carries over setting information and mechanical correction information of a preceding device.

DESCRIPTION OF REFERENCE NUMERALS

10 Library Control Unit (LCU)
11 Library device control firmware
12, 21 Nonvolatile memory
20 Accessor Control Unit (ACU)
30 Drive unit
31 Drive unit control firmware
1A, 1B Device setting information
2A, 2B Mechanical correction information
3A, 3B Unit type
4A, 4B, 4C Drive serial number

The invention claimed is:

1. A library device, comprising:
   an accessor control unit;
   a drive unit; and
   a library control unit which includes a control section configured to obtain unit type information to discriminate a type of unit, as to whether or not the unit is required for a waiting for an activation of the drive unit, kept in each of the library control unit and the accessor control unit,
   wherein when activated, the control section updates a drive identification information item and device setting information kept in the library control unit based on the drive identification information item and device setting information kept in the accessor control unit when the unit type information that is kept in the library control unit is the type which is not required for the waiting for the activation of the drive unit, and
   when each of the unit type information that is kept in the library control unit and the accessor control unit is the type which is required for the waiting for the activation of the drive unit, and the drive identification information item kept in the library control unit and the drive identification information item kept in the accessor control unit are different from each other, the control section waits for the activation of the drive unit to obtain a drive identification information item kept therein,
   compares the drive identification information items respectively kept in the library control unit, the accessor control unit, and the drive unit,
   determines at least one of the library control unit, the accessor control unit, and the drive unit that has a different drive identification item than the other drive identifications items as a replaced unit, and
   updates the drive identification information item and the device setting information kept in the replaced unit based on the drive identification information item and the device setting information kept in the nonreplaced drive unit,
   wherein the device setting information includes mechanical correction information.

2. The library device in accordance with claim 1, wherein the drive identification information is a serial number of a drive.

3. The library device in accordance with claim 2, wherein the control section is configured to obtain the drive identification information items kept in the library control unit, the accessor control unit, and the drive unit;
   compare the three information items with each other; and
   update the drive identification information item kept in the library control unit and the drive identification information item kept in the accessor control unit based on the drive identification information item kept in the drive unit when the drive identification information item kept in the drive unit differs from the drive identification information item kept in the library control unit and the drive identification information item kept in the accessor unit.

4. The library device in accordance with claim 1, wherein the control section is configured to obtain the drive identification information items kept in the library control unit, the accessor control unit, and the drive unit;
   compare the three information items with each other; and
   update the drive identification information item kept in the library control unit and the drive identification information item kept in the accessor control unit based on the drive identification information item kept in the drive unit when the drive identification information item kept in the drive unit differs from the drive identification information item kept in the library control unit and the drive identification information item kept in the accessor unit.

5. A library device, comprising:
   an accessor control unit;
   a drive unit; and
   a library control unit which includes a control section configured to obtain unit type information to discriminate a type of unit, as to whether or not the unit is required for a waiting for an activation of the drive unit, kept in each of the library control unit and the accessor control unit,
   wherein when activated, the control section updates a drive identification information item and device setting information kept in the accessor control unit based on the drive identification information item and device setting information kept in the library control unit when the unit type information that is kept in the accessor control unit is the type which is not required for the waiting for the activation of the drive unit, and
   when each of the unit type information that is kept in the library control unit and the accessor control unit is the type which is required for the waiting for the activation of the drive unit, and the drive identification information item kept in the library control unit and the drive identification information item kept in the accessor control unit are different from each other, the control section waits for the activation of the drive unit to obtain a drive identification information item kept therein,
   compares the drive identification information items respectively kept in the library control unit, the accessor control unit, and the drive unit,
   determines at least one of the library control unit, the accessor control unit, and the drive unit that has a different drive identification item than the other drive identifications items as a replaced unit, and
   updates the drive identification information item and the device setting information kept in the replaced unit based on the drive identification information item and the device setting information kept in the nonreplaced drive unit, wherein the device setting information includes mechanical correction information.

6. The library device in accordance with claim 5, wherein the drive identification information is a serial number of a drive.

7. The library device in accordance with claim 6, the control section is configured to obtain the drive identification information items kept in the library control unit, the accessor control unit, and the drive unit;

compare the three information items with each other; and update the drive identification information item kept in the library control unit and the drive identification information item kept in the accessor control unit based on the drive identification information item kept in the drive unit when the drive identification information item kept in the drive unit differs from the drive identification information item kept in the library control unit and the drive identification information item kept in the accessor unit.

8. The library device in accordance with claim 5, wherein the control section is configured to obtain the drive identification information items kept in the library control unit, the accessor control unit, and the drive unit;

compare the three information items with each other; and update the drive identification information item kept in the library control unit and the drive identification information item kept in the accessor control unit based on the drive identification information item kept in the drive unit when the drive identification information item kept in the drive unit differs from the drive identification information item kept in the library control unit and the drive identification information item kept in the accessor control unit.

* * * * *